United States Patent Office 3,663,526
Patented May 16, 1972

3,663,526
DISAZO DYES CONTAINING AN ALKOXY-
HALOGEN-TRIAZINE GROUP
Fritz Oesterlein, Basel, and Karl Seitz, Oberwil, Basel-Land, Switzerland, assignors to Ciba-Geigy AG, Basel, Switzerland
No Drawing. Filed Oct. 15, 1969, Ser. No. 866,724
Claims priority, application Switzerland, Nov. 4, 1969, 16,383/69
Int. Cl. C09b 62/08
U.S. Cl. 260—153    6 Claims

ABSTRACT OF THE DISCLOSURE

A disazo compound of the formula

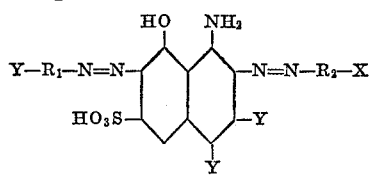

in which one of the symbols Y represents a hydrogen atom and the other symbol Y represents a sulphonic acid group, $R_1$ and $R_2$ each represents an aromatic residue containing a sulphonic acid group, one of the symbols X represents a fibre-reactive alkoxy-halogeno-triazine group bound to the aromatic residue by way of an —NH group, the alkoxy residue containing an etherified alkyl residue, and the other symbol X represents a hydrogen atom or a fibre-reactive acyl residue bound to the aromatic residue by way of an —NH group.

---

This invention provides disazo compound of the formula (1)

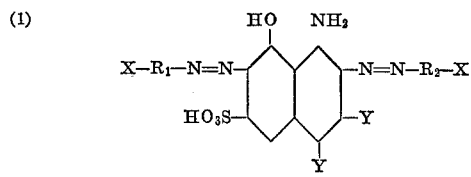

in which one of the symbols Y represents a hydrogen atom and the other symbol Y represents a sulphonic acid group, $R_1$ and $R_2$ each represents an aromatic (component) residue containing a sulphonic acid group, and one of the symbols X represents a fibre-reactive alkoxy-halogeno-triazine group bound to the aromatic residue by way of an —NH group, the alkoxy residue containing an etherified alkyl residue, and the other symbol X represents a hydrogen atom or a fibre-reactive acyl residue bound to the aromatic residue by way of an —NH group.

The compounds of Formula 1 may be obtained (a) by coupling compounds of the formula (2)

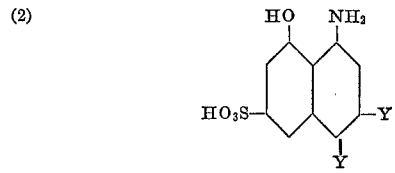

in which Y has the meaning given above, on one side with a diazo compound of an amine of the formula

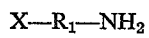

in which $R_1$ has the meaning given above and X represents a hydrogen atom or a fibre-reactive acyl residue bound to $R_1$ by way of an —NH group, especially an alkoxy-halogen-triazine group bound through an —NH group, and on the other side with a diazo compound of an amine of the formula $H_2N—R_2—X$, in which $R_2$ has the meaning given above and X represents a hydrogen atom or a fibre-reactive acyl residue bound to $R_2$ by way of an —NH group, especially an alkoxy - halogeno - triazine group bound through an —NH group, X representing an alkoxy-halogeno-triazine group when the first-mentioned diazo component does not contain such a group, to form a compound of Formula 1 or (b) by condensing compounds of the formula (3)

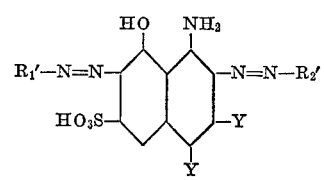

in which Y has the meaning given above and $R'_1$ and $R'_2$ each represents an aromatic residue, one of which contains an acylatable amino group and the other can contain an acylatable amino group, with alkoxy-dihalogeno-triazines and, if necessary, with further acylating agents containing fibre-reactive residues, to form compounds of Formula 1.

The amines of the formulae $X—R_1—NH_2$ and $H_2N—R_2—X$ in which $R_1$, $R_2$ and X have the meanings given above, or the compounds of the Formula 3, in which

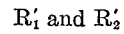

and Y have the meanings given above, used as starting materials for process (b) of the invention can contain further substituents in the aromatic residues $R_1$, $R_2$, $R'_1$ and $R'_2$ in addition to one or two amino groups and one sulphonic acid group each; examples of such substituents are halogen atoms, for example, chlorine or bromine atoms; alkyl groups, for example, methyl groups; alkoxy groups, for example, methoxy or ethoxy groups; acylamino groups, for example, acetylamino, propionylamino or benzoylamino groups; aryl groups, for example, a phenyl group, which itself may be substituted, for example, a para-chlorophenyl group; nitro groups, and also groups imparting solubility in water, for example, a sulphonic acid or carboxyl group.

As amines of the formulae $X—R_1—NH_2$ and

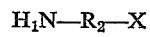

in which $R_1$, $R_2$ and X have the meanings given above, the amines hereinafter mentioned and also the condensation products thereof with the acylating agents listed below which contain fibre-reactive residues may be used, especially condensation products with alkoxy-halogeno-triazines, it being essential that the acylated amines also contain a further diazotizable amino group to enable coupling with the 1-amino-8-hydroxynaphthalene-3,6- or -4,6-disulphonic acid used as starting material in accordance with process (a), or with the corresponding monoazo compound obtained from 1-amino-8-hydroxynaphthalene-3,6- or 4,6-disulphonic acid by unilateral coupling with a diazo compound derived from an amine of the formula

or $H_2N—R_2—X$.

The following are given as examples:

1-aminobenzene-2-, -3- or -4-sulphonic acid,
1-aminobenzene-2,5-disulphonic acid,
1-amino-4-methylbenzene-2-sulphonic acid,
1-amino-5-acetylaminobenzene-2-sulphonic acid,
1-amino-4-acetylaminobenzene-2-sulphonic acid,
1-amino-4-nitrobenzene-2-sulphonic acid,
1-amino-6-methylbenzene-2,4-disulphonic acid,
1-amino-4-methoxybenzene-2-sulphonic acid,
1-amino-4,6-dimethylbenzene-2-sulphonic acid,
1-amino-5-fluorobenzene-2-sulphonic acid,
1-aminobenzene-2,4,6-trisulphonic acid,
1-amino-4,α-sulphoacetylaminobenzene-2-sulphonic acid,
1-amino-5,α-sulphoacetylaminobenzene-2-sulphonic acid,
1-aminobenzene-2,4-disulphonic acid,
1-amino-4-chlorobenzene-2-sulphonic acid,
1-amino-2-methoxybenzene-4- or -5-sulphonic acid,
1,3-diaminobenzene-6-sulphonic acid,
1-amino-2'-carboxybenzene-4-sulphonic acid,
2-aminonaphthalene-4,6,8-trisulphonic acid,
2-amino-6-nitronaphthalene-4,8-disulphonic acid,
1-amino-3-carboxybenzene-6-sulphonic acid,
4-aminodiphenyl-3-sulphonic acid,
1-amino-2-chlorobenzene-4-sulphonic acid,
1-amino-2-ethylbenzene-4-sulphonic acid,
1,4-diaminobenzene-2-sulphonic acid,
1,4-diamino-3-methylbenzene-6-sulphonic acid,
1-amino-2-methyl-5-chlorobenzene-4-sulphonic acid,
1,4-diaminobenzene-2,5-disulphonic acid,
1,4-diaminobenzene-2,6-disulphonic acid,
1,3-diaminobenzene-4,6-disulphonic acid,
1,3-diamino-2,4,6-trimethylbenzene-5-sulphonic acid,
1-amino-3-nitrobenzene-5-sulphonic acid,
1-amino-3-acetylaminobenzene-5-sulphonic acid,
1-amino-4-phenylaminobenzene-3-sulphonic acid,
1-amino-4-(4'-aminophenylamino)-benzene-3-sulphonic acid,
4-aminodiphenyl-3,3'-disulphonic acid,
4,4'-diaminodiphenyl-3,3'- or -2,2'-disulphonic acid,
1,4'-diamino-4-phenylamino-2,2'-disulphonic acid,
4,4'-diaminostilbene-3,3'-disulphonic acid,
1-aminonaphthalene-3- or -4-sulphonic acid,
2-aminonaphthalene-5-, -6-, -7- or -8-sulphonic acid,
1-aminonaphthalene-5-, -6-, -7- or -8-sulphonic acid,
2-aminonaphthalene-1- or -8-sulphonic acid,
1-aminonaphthalene-3,6- or 4,6-disulphonic acid,
1-aminonaphthalene-3,8-disulphonic acid,
2-aminonaphthalene-4,8- or -6,8-disulphonic acid,
1-aminonaphthalene-3,6,8-trisulphonic acid,
2-aminonaphthalene-3,6,8-trisulphonic acid,
1-aminonaphthalene-4,6,8-trisulphonic acid,
2-aminobenzthiazole-5- or -6-sulphonic acid,
1-aminopyrene-3- or -4-sulphonic acid, and
3-aminopyrene-di- and tri-sulphonic acid.

Disazo compounds of Formula 1 which are of special interest are those in which X and Y have the meanings ascribed to them in the said formula and in which $R_1$ and $R_2$ each represents a monosulpho- or disulphobenzene residue.

The disazo compounds of Formula 1, in which the residues $R_1$ and $R_2$ are benzene residues, that are worthy of special mention are those which contain a sulphonic acid group in ortho-position to the azo group and in which the acylamino group, which contains a fibre-reactive residue, is situated in meta-position to the azo group. These disazo compounds preferably contain only one fibre-reactive group.

Diazotization of the amines used in accordance with the invention, for example, those indicated above, and the coupling thereof with the 1-amino-8-hydroxynaphthalene-3,6- or -4,6-disulphonic acid used as starting material can be carried out successively, it being advantageous first to effect acidic coupling and then alkaline coupling. In an acidic solution coupling takes place at a position vicinal to the amino group of the starting component, and in a slightly acid to weakly alkaline solution the second diazo component couples at a position vicinal to the hydroxyl group of the starting component. One of the amines used as diazo component can be free from acyl groups containing fibre-reactive residues, but both amines may contain such an acyl group, in which case it is preferable that the acyl groups be identical. In any case, one of the two amines must contain an alkoxy-halogeno-triazine group as fibre-reactive acyl residue. When the end product is to contain only one reactive group, this is advantageously introduced with the diazo component which couples in an alkaline medium.

Diazotization of the amines used in accordance with the present invention may be effected by known methods, for example, with hydrochloric acid and sodium nitrite. Coupling may also be carried out according to known methods in an acid medium and in a slightly acid to weakly alkaline medium.

Preparation of the amines of the formulae $$X-R_1-NH_2$$

and $$H_2N-R_2-X$$

in which $R_1$ and $R_2$ have the meanings given above and X represents an acyl residue containing a fibre-reactive residue and which is bound to $R_1$ or $R_2$ by way of an —NH group, the fibre-reactive residue being for example one of the aliphatic or heterocyclic fibre-reactive residues mentioned below or especially an alkoxy-halogeno-triazine residue in which the alkoxy residue contains an etherified alkyl residue, may be effected by condensing diamines of the formula $$H_2N-R_1-NH_2$$

or $$H_2N-R_2-NH_2$$

with the corresponding acylating agents which react with an amino group with formation of a fibre-reactive grouping.

By "fibre-reactive substituent" is meant a reactive grouping capable of reacting with the hydroxyl groups of cellulose or with the carboxylic acid amide groups of polyamides with formation of a covalent bond. Residues of the kind defined are aliphatic and especially heterocyclic residues; fibre-reactive diazine and especially triazine substituents are preferred.

The following are examples of suitable acylating agents having a reactive acyl residue: the anhydrides or acid halides of aliphatic α,β-unsaturated carboxylic acids, for example, chloromaleic anhydride, propiolic acid chloride, acrylic acid chloride and especially the halides of aliphatic carboxylic acids containing exchangeable halogen atoms, for example, chloroacetyl chloride, sulphochloro-acetic acid chloride, β-bromo- or chloro-propionic acid chloride, α,β-dichloro- or -dibromo-propionic acid chloride, fluorocyclobutane-carboxylic acid halides, for example, tri- and tetra-fluorocyclobutane-carboxylic acid chlorides, α-chloro- or α-bromo-acrylic acid chloride or bromide, and also heterocyclic acylating agents, for example, 2-halogeno-benzthiazole- or -oxazolecarboxylic- or -sulphonic acid chloride, 3,6-dichloropyridazine-5-carboxylic acid chloride, tetrachloropyridazine, 4,5 - dichloropyridazon-(6)-yl-propionic acid chloride, 4,5 - dichloro - 1 - phenylpyridazone-carboxylic or -sulphonic acid chloride, 4,5-dichloropyridazone-propionic acid chloride, 1,4-dichlorophthalazine-carboxylic or -sulphonic acid chloride, 2,3-dichloroquinoxaline-carboxylic or -sulphonic acid chloride, 2,4-dichloroquinazoline-carboxylic or -sulphonic acid chloride, 2,4,6-trichloro- or 2,4,6-tribromopyrimidine and the derivatives thereof which contain, for example, in 5-position a cyano, nitro, methyl, ethyl, carboxylic acid amide, sulphamide, carbomethoxy, carbalkoxy, acyl (for example, benzoyl, acetyl or propionyl), alkenyl (for example, allyl or chlorovinyl) group or a substituted alkyl group (for example, carboxymethyl, chloromethyl or bromomethyl group), 2,4,5,6-tetrachloro- or 2,4,5,6-tetra-bromopyrimidine, 2,6 - dichloro- or 2,6-dibromo-4-carboethoxypyrimidine, 2,4,5 - trichloropyrimidine, 5 - nitro-6-methy-2,4-dichloropyrimidine, 2,4 - dichloropyrimidine - 6-carboxylic acid chloride, 2,4 - dichloropyrimidine-5-carboxylic acid chloride, 2,6 - dichloro- or 2,6-dibromopyrimidine-4- or -5 - carboxylic acid or sulphonic acid amides or -4- or -5-carboxylic acid or -sulphonic acid chloride, 2,4 - dichloropyrimidine-5-sulphonic acid, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo - 5 - bromomethylpyrimidine, 2,5,6 - tricloro-4-methylpyrimidine, 2,6 - dichloro-4-trichloromethylpyrimidine or especially 2 - methanesulphonyl-4,5-dichloro-6-methylpyrimidine, 2,4 - dimethanesulphonyl - 5-chloro-6-methylpyrimidine, 2,4,6 - trichloro-1,3,5-triazine or 2,4,6-tribromo - 1,3,5-triazine and 4,6-dichloro-1,3,5-triazines that are substituted in 2 - position by an aryl or alkyl residue, for example, a phenyl, methyl or ethyl residue, or by the residue of an aliphatic or aromatic mercapto or hydroxyl compound bound by way of the sulphur or oxygen atom respectively, or especially by an amino group or by the residue of an aliphatic, heteroaliphatic or aromatic amino compound bound through its nitrogen atom. The following are examples of compounds of the kind mentioned the residues of which can be bound to the triazine nucleus at 2 - position by reaction with trihalogeno-triazines: aliphatic or aromatic mercapto or hydroxyl compounds, for example, thioalcohols, thioglycollic acid, thiourea, thiophenols, methyl alcohol, ethyl alcohol, isopropyl alcohol, glycollic acid, phenol, chloro- or nitro-phenols, phenol carboxylic and phenol sulphonic acids, naphthols, naphthol sulphonic acids, and so forth, but especially ammonia and compounds containing acylatable amino groups, for example, hydroxylamine, hydrazine, phenylhydrazine, phenylhydrazine sulphonic acid, carbamic acid and the derivatives thereof, semi- and thiosemi-carbazides and -carbazones, methylamine, ethylamine, isopropylamine, methoxyethylamine, methoxypropylamine, dimethylamine, diethylamine, methylphenylamine, ethylphenylamine, chloroethylamine, ethanolamines, propanolamines, benzylamine, cyclohexylamine, morpholine, piperidine, piperazine, aminocarbonic acid esters, aminoacetic acid ethyl esters, aminoethane sulphonic acid, N-methylaminoethane sulphonic acid, and especially aromatic amines, for example, aniline, N-methylaniline, toluidines, xylidines, chloroanilines, para- or meta-aminoacetanilide, nitroanilines, aminophenols, nitrotoluidines, phenylenediamines, toluylenediamines, anisidine, phenetidine, diphenylamine, naphthylamines, aminonaphthols, diaminonaphthalenes, and especially anilines containing acidic groups, for example, sulphanilic, metanilic and orthanilic acid, aniline disulphonic acids, aminobenzyl sulphonic acids, aniline, ω-methane sulphonic acid, aminodibenzoic acids, naphthylamine-di- and -tri-sulphonic acids, aminobenzoic acids, for example, 1- or 2 - hydroxy-5-aminobenzoic acid, amino-naphthol-mono-, -di- and -tri-sulphonic acids, aminobenzoic acid-sulphonic acid, and so forth, and also coloured compounds having dyestuff characteristics, for example, 4-nitro-4'-aminostilbene disulphonic acid and aminoazo dyestuffs or aminoanthraquinones or phthalocyanines that also contain at least one reactive amino group.

The acylation process (condensation) can be performed in known manner, for example, in an aqueous medium in the presence of an agent capable of binding acid, for example, sodium hydroxide or sodium carbonate.

The introduction of the triazine residues substituted in 2-position by the residue of a hydroxyl, mercapto or amino compound or ammonia and especially by the alkoxy residues mentioned below containing an etherified alkyl residue into the compounds of Formula 2 can also be effected by first acylating the starting diamine with a 2,4,6-trihalogeno-1,3,5-triazine, especially cyanuric chloride, and then replacing a halogen atom in the dihalogeno-triazine compound so obtained by reaction with one or a plurality of the above mentioned compounds before or after coupling the diazotized acylated diamine with the 1-amino-8-hydroxynaphthalene-3,6- or -4,6-disulphonic acid to form a compound of Formula 1.

Of the acylating agents containing an alkoxy-halogeno-triazine residue in which the alkoxy group containing up to 7 carbon atoms and carries an etherified alkyl group containing up to 6 carbon atoms, including cyclic ether groupings, for example, the oxacyclopentyl residue, those of special value contain an alkylene bridging component that may be branched and that contain at least 2, but preferably not more than 4 carbon atoms. The following are given as examples: $\beta$-methoxy-ethoxy-, $\gamma$-methoxy-propoxy-, methoxy-isopropoxy-, $\gamma$ - methoxy-butoxy-, $\delta$-methoxy-butoxy-, $\beta$ - ethoxy-ethoxy-, ethoxy-isopropoxy-, ethoxy-butoxy-, ethoxy-isobutoxy-, $\beta$-propoxy-ethoxy-, $\gamma$-propoxy-propoxy-, $\gamma$-isopropoxy-propoxy-, $\beta$ - n - butoxy-ethoxy-, isopropoxy-butoxy-, n-hexoxy-ethoxy-, oxacyclopentylmethoxy-, $\beta$-($\beta$-methoxyethoxy) - ethoxy-, $\beta$-($\beta$-ethoxy-ethoxy)-ethoxy-, $\beta$-($\beta$-isopropoxyethoxy)-ethoxy-, $\beta$-ethoxy-ethoxy-methoxy-, $\beta$-ethyl-mercapto-ethoxy-, $\beta$-phenoxy-ethoxy-, para-methoxy-benzyloxy-, diethoxy-isopropoxy-, $\beta$-allyloxy-ethoxy-, $\beta$-vinyloxy-ethoxy-, $\beta$-propargyloxy-ethoxy-, $\gamma$-ethoxy-propoxy-dichloro- or -dibromo-1,3,5-triazine.

These alkoxy-halogeno-triazines can be prepared by reacting a 2,4,6-trichloro- or -tribromo-1,3,5-triazine with an alcohol in the presence of an agent capable of binding acid, preferably in the absence of water.

The alcohols that can be used for the condensation are the alkoxy-alkanols corresponding to the alkoxy-alkoxy groups, for example, ethoxyethanol, isopropoxypropanol, hexoxyethanol, methoxybutanol, and so forth.

The starting materials required for process (b) of the invention can be obtained by coupling 1-amino-8-hydroxy-naphthalene-3,6- or -4,6-disulphonic acid in known manner with diazotized monoamines or diamines, or mono-amines containing a group convertible into a free $H_2N$-group, for example, a nitro group, for example with those mentioned in the description of process (a) which are free from acyl residues containing fibre-reactive groups. In this case too, it is advantageous first to couple in an acidic medium and then in an alkaline medium as in process (a). Subsequently, acylation to form the disazo compounds of Formula 1 is effected, one of the acyl groups introduced being essentially an alkoxy-halogeno-triazine group in which the alkoxy reidue contains an etherified alkyl residue. Suitable acylating agents are those recommended for process (a).

Condensation of these acylating agents with the compounds of Formula 3 in accordance with the invention may be carried out by known methods, advantageously in the presence of an agent capable of binding acid, for example, sodium acetate, sodium hydroxide or sodium carbonate, and under conditions such that at least one exchangeable substituent, for example, a halogen atom, remains in the end product, that is to say, for example, in the presence of an organic solvent or at a relative low to moderately elevated temperature in an aqueous medium. When a cyanuric halide is used, especially cyanuric chloride, the dihalogeno-triazine compound that is first formed can be converted into a monohalogeno-triazine compound by subsequent exchange of a further halogen atom for one of the residues indicated, as already mentioned in respect of the dihalogeno-triazines prepared by coupling. The reactants used in this method of preparation are the above mentioned mercapto, hydroxyl and amino compounds, and the reaction conditions are preferably also the same as those described above.

The compounds obtained by coupling or acylation in accordance with the processes of the invention are new.

They are valuable dyestuffs and are suitable for dyeing and printing a very wide variety of materials, for example, cellulosic materials of fibrous structure for example linen, regenerated cellulose and cotton. They have excellent building-up properties and are specially suitable for application according to the so-called "pad-dyeing" process in which the material is impregnated with an aqueous dyestuff solution, which may also contain salt, and the dyestuff or dyestuffs are fixed after a treatment with an alkali or in the presence of an alkali, if necessary, with the application of heat. The dyestuffs prepared in accordance with the processes of the invention are also suitable for printing. In this method of application they are especially suitable for use in a very rapid two-step printing process in which impregnation with the dyestuff solution and the treatment with the alkali are carried out in two separate phases. These processes and the direct-dyeing process, according to which many of the dyestuffs obtained in accordance with the processes of the invention can also be applied, yield dyeings and prints that are generally distinguished by good fastness to light and especially by excellent fastness to washing. The dyeings are dischargeable. The dyestuffs obtained in accordance with the processes of the invention are also distinguished by a very even build-up on staple fibres of regenerated cellulose, a high degree of fixation and a high degree of stability towards acids; furthermore, any unfixed dyestuff can easily be washed out. It is specially emphasized that the new dyestuffs yield valuable black shades when used in conjunction with orange or brown dyestuffs; the dyeings remain neutral, that is to say, show no change in shade when produced in different strengths.

The dyestuffs obtainable in accordance with the processes of the invention are also suitable for dyeing nitrogenous fibres, for example, polyamides, polyurethanes, silk, leather and especially wool, in a weakly acid, neutral or weakly alkaline bath, if necessary, in the presence of one of the usual additives, for example, an ethylene oxide condensation product of an amine of high molecular weight.

The dyestuffs are also suitable for printing fabrics made of or containing nitrogenous fibres, for example, wool or silk, or union fabrics containing wool.

The following examples illustrate the invention, the parts and percentages being by weight, unless otherwise stated.

EXAMPLE 1

250 parts of 2-(ethoxy-ethoxy)-4,6-dichloro-1,3,5-triazine are added within 15 minutes to a solution of 21 parts of the sodium salt of 1,3-diaminobenzene-6-sulphonic acid in 200 parts of water. The mixture is stirred at 20° C. and neutralized by the dropwise addition of a dilute sodium hydroxide solution. The solution which forms is acidified with 30 parts of 30% hydrochloric acid and diazotization is carried out with an aqueous solution of 6 parts of sodium nitrite.

The diazo suspension is run into a neutral solution of the monoazo dyestuff obtained by coupling 17.3 parts of diazotized orthanilic acid with 31.9 parts of 1-amino-8-hydroxynaphthalene-3,6-disulphonic acid in a medium that reacts acid to Congo paper. At the same time, the pH of the mixture is kept at between 6 and 7 with sodium carbonate. The disazo dyestuff which forms is salted out, isolated by filtration and dried. It dyes cotton a greenish blue shade.

A dyestuff having similar properties is obtained when the orthanilic acid is replaced by the corresponding amount of aniline-2,5-disulphonic acid in the preparation of the monoazo dyestuff.

Further dyestuffs that dye cotton the shades indicated in column IV of the following table may be obtained by coupling the diazo compounds of the amines shown in column I with the coupling components shown in column II in an acid solution and then coupling the monoazo dyestuffs so obtained in an alkaline medium with the diazo components listed in column III in accordance with the process described in Example 1.

| | I | II | III | IV |
|---|---|---|---|---|
| 1 |  | 1-amino-8-hydroxy-naphthalene-3,6-disulphonic acid. | 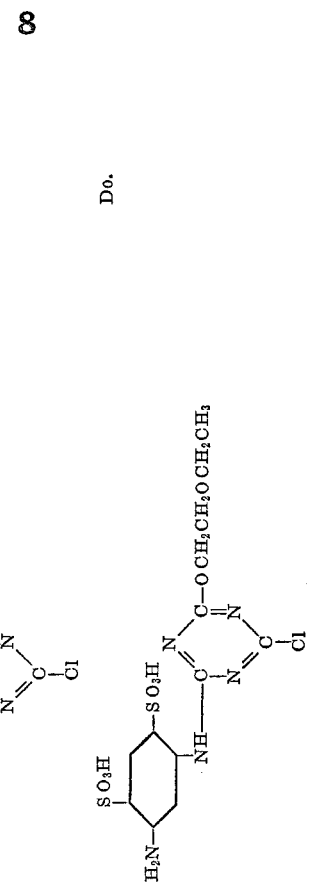 | Greenish blue. |
| 2 | 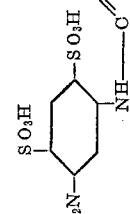 | ......do...... | | Do. |

TABLE—Continued
| | I | II | III | IV |
|---|---|---|---|---|
| 3 | 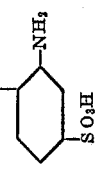 | do | 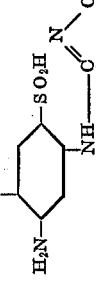 | Greenish blue. |
| 4 | Same as above | do | 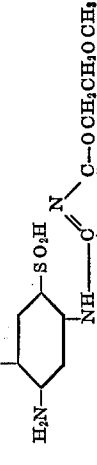 | Do. |
| 5 | 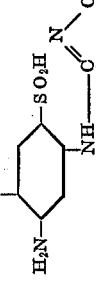 | do | 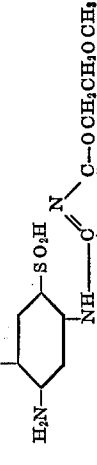 | Do. |
| 6 | 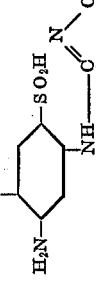 | do | 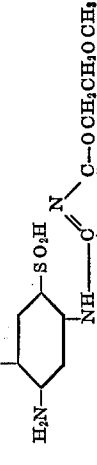 | Do. |
| 7 | 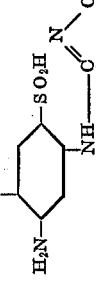 | do | 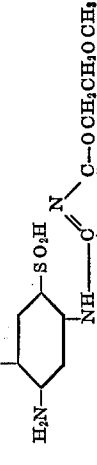 | Do. |

TABLE—Continued

| | I | II | III | IV |
|---|---|---|---|---|
| 8 | 3-amino-benzene-1,4-disulphonic acid structure (SO₃H, NH₂, SO₃H on benzene) | 1-amino-8-hydroxy-naphthalene-4,6-disulphonic acid. | Aniline derivative with SO₃H, NH–triazine(Cl, OCH₂CH₂OCH₂CH₃), NH₂ | Greenish blue. |
| 9 | 2-amino-4-methyl-benzene-1,5-disulphonic acid (CH₃, NH₂, SO₃H, HO₃S) | 1-amino-8-hydroxy-naphthalene-3,6-disulphonic acid. | Aniline derivative with SO₃H, NH–triazine(Cl, OCH₂CH₂OCH₂CH₃), NH₂ | Blue. |
| 10 | 2-amino-naphthalene-disulphonic acid (NH₂, SO₃H, HO₃S) | ......do...... | Same as above. | Blue with pronounced greenish tinge. |
| 11 | Same as above | ......do...... | Aniline derivative with NH–triazine(Cl, OCH₂CH₂OCH₂CH₃), SO₃H, NH₂ | Do. |
| 12 | Biphenyl derivative (NH₂, SO₃H) | ......do...... | Aniline derivative with NH–triazine(Cl, OCH₂CH₂OCH₂CH₃), SO₃H, NH₂ | Do. |

| | I | II | III | IV |
|---|---|---|---|---|
| 13 | (naphthalene with HO3S, NH2, SO3H, O2N substituents) | do. | (aniline-SO3H with NH-triazine bearing Cl and O-CH(CH2OCH3)CH2OCH3 glycerol-type group) | Blue with pronounced greenish tinge. |
| 14 | Same as above | do. | (aniline-SO3H with NH-triazine bearing Cl and OCH2CH2OCH2CH3) | Do. |
| 15 | (benzene with COOH, NH2, SO3H) | do. | (aniline-SO3H with NH-triazine bearing Cl and OCH2CH2OCH2CH3) | Greenish blue. |
| 16 | (naphthalene with HO3S, NH2, SO3H, HO3S) | do. | (aniline-SO3H with NH-triazine bearing Cl and OCH2CH2OCH2CH3) | Blue with pronounced greenish tinge. |
| 17 | (aniline with SO3H, NH2, NH-triazine bearing Cl and OCH2CH2OCH2CH3) | do. | (aniline-SO3H, H2N) | Greenish blue. |

TABLE—Continued
| | I | II | III | IV |
|---|---|---|---|---|
| 18 | Same as above | 1-amino-8-hydroxynaphthalene-4,6-disulphonic acid. | Same as above | Greenish blue. |
| 19 | do | 1-amino-8-hydroxynaphthalene-3,6-disulphonic acid. | 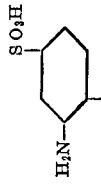 | Do. |
| 20 | do | do | 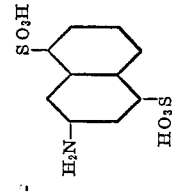 | Blue with pronounced greenish tinge. |
| 21 | do | do | 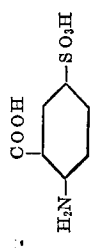 | Greenish blue. |
| 22 | do | do | 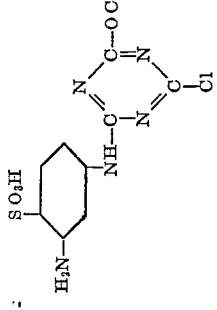 | Do. |
| 23 | do | do | Same as above | Do. |
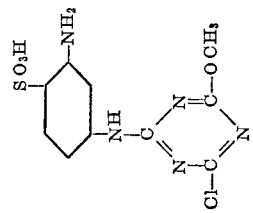

TABLE—Continued

| | I | II | III | IV |
|---|---|---|---|---|
| 24 | | ...do... | ...do... | Greenish blue. |
| 25 | | | | Do. |
| 26 | | | | Do. |
| 27 | | 1-amino-8-hydroxy-naphthalene-4,6-disulphonic acid. | Same as above. | Do. |
| 28 | | 1-amino-8-hydroxynaphthalene-3,6-disulphonic acid. | | Do. |

TABLE—Continued

| I | II | III | IV |
|---|---|---|---|
| 29 ... (structure: aminobenzenesulfonic acid linked via NH to triazine with Cl and OCH₂CH₂OCH₃ substituents) | ...do... | (structure: aminobenzenesulfonic acid linked via NH to triazine with Cl and C-NH₂ substituents) | Greenish blue. |
| 30 ... Same as above | ...do... | (structure: aminobenzenesulfonic acid linked via NH to triazine with Cl and OCH(CH₃)₂ substituents) | Do. |
| 31 ... (structure: aminobenzenesulfonic acid linked via NH to triazine with Cl and OCH₂CH₂OCH₂CH₃ substituents) | ...do... | (structure: aminobenzenesulfonic acid linked via NH to dichloropyrimidine) | Do. |
| 32 ... Same as above | ...do... | (structure: aminobenzenesulfonic acid linked via NH to triazine with Cl, OCH₃ and OCH₂OCH₃ substituents) | Do. |
| 33 ... (structure: CH₃OCH₂CH₂O and Cl substituted triazine linked via NH to aminobenzenesulfonic acid) | ...do... | Same as above | Do. |

EXAMPLE 2

23 parts of 3-acetylamino-1-aminobenzene-6-sulphonic acid are diazotized and coupled with a solution of 31.9 parts of 1 - amino-8-hydroxynaphthalene-3,6-disulphonic acid at 15° C. When coupling is finished the batch is neutralized to pH 5 with a sodium hydroxide solution. A further 23 parts of 3-acetylamino-1-aminobenzene-6-sulphonic acid are diazotized and coupled at pH 6 to form the disazo dyestuff. Sodium hydroxide solution is then added to the dyestuff solution so that a 4% solution is formed, and the acetyl group is hydrolysed by heating for 4 hours at 90° C. The batch is then neutralized to pH 7 with hydrochloric acid, cooled to 30° C. and condensation is carried out at 30° C. with 44.8 parts of methoxyethoxy-dichlorotriazine. The hydrochloric acid that is liberated is neutralized by the dropwise addition of 100 parts of a 2 N sodium hydroxide solution. The dyestuff is precipitated by the addition of sodium chloride, isolated by filtration and dried. The dyestuff so obtained dyes cotton a greenish blue shade.

Dyeing procedure 2 parts of dyestuff are dissolved in 100 parts of water. A cotton fabric is impregnated with the solution so obtained in a manner such that its weight is increased by 75% and then dried.

The fabric is then impregnated at 20° C. with a solution containing 10 grams of sodium hydroxide and 300 grams of sodium chloride per litre, squeezed to a weight increase of 75%, steamed for 60 seconds at 100 to 101° C., rinsed, soaped for 15 minutes in a 0.3% solution of a non-ionic detergent at the boil, rinsed and dried.

Printing procedure 30 parts of dyestuff and 150 parts of urea are dissolved in 380 parts of water, and the solution so obtained is stirred into 400 parts of a 5% aqueous sodium alginate thickener. 30 parts of sodium bicarbonate and 10 parts of an oxidizing agent (for example, Albatex BD=sodium meta-nitrobenzene sulphonate) are then added while stirring.

A cotton fabric is printed with this printing paste and dried. The fabric thus treated is then steamed for 1 to 2 minutes at 100 to 102° C., rinsed thoroughly in cold water, then in hot water and dried.

We claim:

1. A disazo compound of the formula

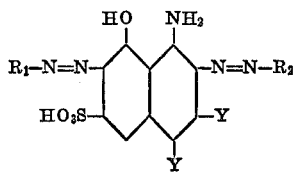

in which one of the symbols Y represents hydrogen and the other symbol Y represents sulphonic acid, $R_1$ and $R_2$ are each sulfophenyl or sulfophenyl substituted by chloro, bromo, fluoro, α-sulfoacetylamino, methyl, ethyl, methoxy, ethoxy, acetylamino, propionylamino, benzoylamino, phenyl, p-chlorophenyl, nitro, sulfo, carboxyl or a triazine group of the formula

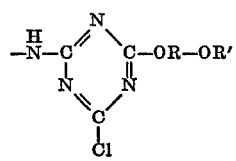

wherein OR is alkoxy of up to 7 carbon atoms and OR' is alkoxy of up to 6 carbon atoms; in which at least one of $R_1$ and $R_2$ contains said triazine group.

2. The compound of claim 1 wherein $R_1$ and $R_2$ are each sulfophenyl or sulfophenyl substituted by sulfo.

3. A disazo compound of the formula

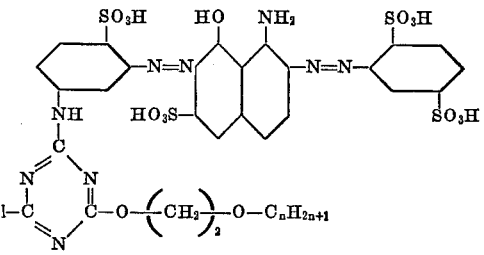

in which $n=1$ or 2.

4. A dyestuff that in its free acid state corresponds to the formula

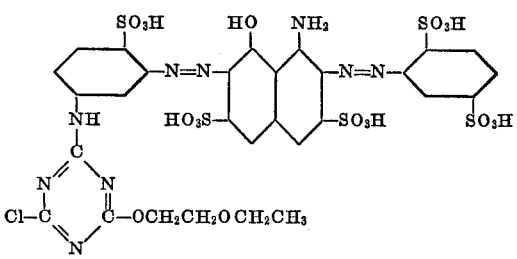

5. A dyestuff that in its free acid state corresponds to the formula

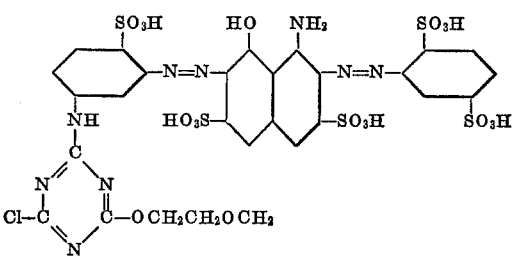

6. A dyestuff that in its free acid state corresponds to the formula

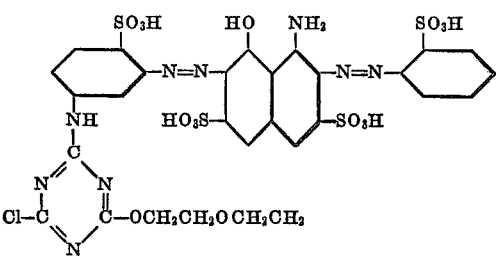

References Cited

UNITED STATES PATENTS 2,945,021    7/1960    Fasciati et al. _____ 260—153
3,190,872    6/1965    Oesterlein et al. _____ 260—153

JOSEPH REBOLD, Primary Examiner

D. M. PAPUGA, Assistant Examiner

U.S. Cl. X.R.

260—154, 248 CS, 249.5, 249.8, 251 R, 256.4 R; 8—21, 41 R, 163

CERTIFICATE OF CORRECTION

Patent No. 3,663,526          Dated May 16, 1972

Inventor(s)  Fritz Oesterlein et al

It is certified that error appears in the above-identified patent and that said Letters Patent are hereby corrected as shown below:

Column 22, in the center portion of the formula of claim 3,

" 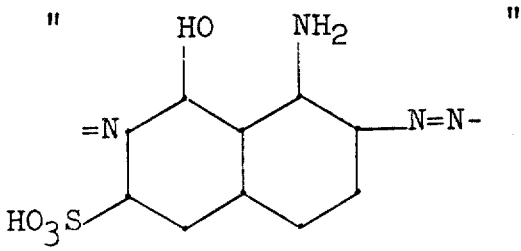 "

should be ---  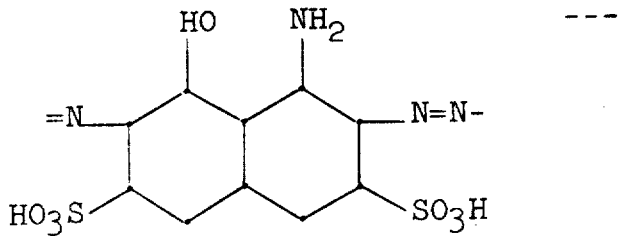  ---

Signed and sealed this 25th day of December 1973.

(SEAL)
Attest:

EDWARD M.FLETCHER,JR.          RENE D. TEGTMEYER
Attesting Officer              Acting Commissioner of Patents